United States Patent [19]

Uemura et al.

[11] Patent Number: 4,904,723
[45] Date of Patent: Feb. 27, 1990

[54] HYDROLYZED ETHYLENE-VINYL ACETATE COPOLYMER COMPOSITION

[75] Inventors: Tomoyoshi Uemura; Shinji Okamoto, both of Kurashiki; Takamasa Moriyama, Suita; Kuniyoshi Asano, Hirakata; Hiroshi Takida, Takatsuki, all of Japan

[73] Assignee: Nippon Gohsei Kagaku Kogyo Kabushiki Kaisha, Osaka, Japan

[21] Appl. No.: 236,829

[22] Filed: Aug. 26, 1988

[30] Foreign Application Priority Data

Nov. 20, 1987 [JP] Japan ................ 62-294549

[51] Int. Cl.$^4$ .............................................. C08K 5/04
[52] U.S. Cl. ................................ 524/394; 524/417; 525/60
[58] Field of Search ............... 524/394, 417; 525/60

[56] References Cited

U.S. PATENT DOCUMENTS

| | | | |
|---|---|---|---|
| 3,262,905 | 7/1966 | Martins | 525/60 X |
| 3,595,740 | 7/1971 | Gerow | 161/254 |
| 3,890,267 | 6/1975 | Fukushima et al. | 524/417 X |
| 4,463,124 | 7/1984 | Flores et al. | 524/417 X |
| 4,581,290 | 4/1986 | Henkel et al. | 524/417 X |

FOREIGN PATENT DOCUMENTS 50-53481  5/1975 Japan.
51-67384  6/1976 Japan.
50-112887 10/1976 Japan.

Primary Examiner—Joseph L. Schofer
Assistant Examiner—J. M. Reddick
Attorney, Agent, or Firm—Armstrong, Nikaido, Marmelstein, Kubovcik & Murray

[57] ABSTRACT

A composition comprising
(1) a hydrolyzed ethylene-vinyl acetate copolymer having an ethylene content of 20 to 60% by mole and a degree of hydrolysis in the vinyl acetate component of at least 95% by mole and
(2) a secondary or tertiary alkali metal phosphate; the alkali metal content being from 15 to 250 ppm of the hydrolyzed copolymer (1) and the phosphorus content being from 5 to 70 ppm of the hydrolyzed copolymer (1). The composition of the invention is excellent in adhesive strength to unsaturated carboxylic acid-modified polyolefins, and therefore the laminate having the structure the polyolefin layer/the unsaturated carboxylic acid-modified polyolefin layer/the hydrolyzed ethylene-vinyl acetate copolymer composition of the invention layer has excellent adhesive strength between the unsaturated carboxylic acid-modified polyolefin layer and the layer of the composition of the present invention.

2 Claims, No Drawings

HYDROLYZED ETHYLENE-VINYL ACETATE COPOLYMER COMPOSITION

BACKGROUND OF THE INVENTION

The present invention is related to a hydrolyzed ethylene-vinyl acetate copolymer composition, and more particularly to a hydrolyzed ethylene-vinyl acetate copolymer composition having excellent adhesive strength to a polyolefin modified with an unsaturated carboxylic acid which are widely used as a tie resin layer upon lamination of a polyolefin layer and a hydrolyzed ethylene-vinyl acetate copolymer layer.

Two or more-layer laminates having a structure wherein polyolefin layers and hydrolyzed ethylene-vinyl acetate copolymer layers are laminated are well-balanced in excellent water resistance resulting from the polyolefin and in excellent oxygen impermeability, oil resistance and solvent resistance resulting from the hydrolyzed ethylene-vinyl acetate copolymer. So, the laminates of the polyolefin layers and the hydrolyzed ethylene-vinyl acetate copolymer layers are expected to be used for various uses including wrapping and packaging materials such as films, sheets, bags or containers for foods. The polyolefins and the hydrolyzed ethylene-vinyl acetate copolymer, however, adhere unsatisfactorily to each other. Therefore, even if these two kinds of the resins are laminated by means of a melt coextrusion or a melt coating, the obtained laminates cause interlayer peeling between the polyolefin layer and the hydrolyzed ethylene-vinyl acetate copolymer layer, which are not practically used.

In order to improve the interlayer peeling in the laminate of the polyolefin layer and the hydrolyzed ethylene-vinyl acetate copolymer layer, it has been proposed (1) to blend at least one of the polyolefin layer and the hydrolyzed ethylene-vinyl acetate copolymer layer with the resin composing of the other layer, (2) to blend at least one of the polyolefin layer and the hydrolyzed ethylene-vinyl acetate copolymer layer with a resin capable of imparting adhesive strength such as ethylene-acrylic acid ester copolymer, an ionomer, a hydrolyzed ethylene-vinyl acetate copolymer rich in an ethylene content or a polyolefin grafted with an unsaturated polyvalent carboxylic acid, and the like. However, when blending the above-mentioned other resin with the hydrolyzed ethylene-vinyl acetate copolymer, it tends to impair the excellent oxygen impermeability and oil or solvent resistance originally existing in the hydrolyzed copolymer. On the other hand, when blending the other resin with the polyolefin, it tends to impair the excellent transparency and surface smoothness. The improvement of adhesive strength is unsatisfactory in the both cases.

In order to improve the adhesive strength between the polyolefin layer and the hydrolyzed ethylene-vinyl acetate copolymer layer solving the above-mentioned defects, it has been tried to study in various ways as to methods in which a tie resin layer is laid between the polyolefin layer and the hydrolyzed ethylene-vinyl acetate copolymer layer. Japanese Unexamined Patent Publication No. 112887/1976 discloses polyolefins modified with unsaturated carboxylic acids as the tie resin. In the above methods, since both the polyolefin layer and the hydrolyzed ethylene-vinyl acetate copolymer layer do not blend with the other resins, the excellent properties originally existing in the polyolefin and the hydrolyzed ethylene-vinyl acetate copolymer remain intact, but the obtained laminates are practically unsatisfactory in the adhesive strength between the hydrolyzed ethylene-vinyl acetate copolymer and the tie resin.

An object of the invention is to provide a hydrolyzed ethylene-vinyl acetate copolymer composition having excellent adhesive strength to a tie resin of a polyolefin modified with an unsaturated carboxylic acid.

This and other objects of the present invention will become apparent from the following description.

SUMMARY OF THE INVENTION

In accordance with the present invention, there is provided a composition comprising (1) a hydrolyzed ethylene-vinyl acetate copolymer having an ethylene content of 20 to 60% by mole and a degree of hydrolysis in the vinyl acetate component of at least 95% by mole and (2) a secondary or tertiary alkali metal phosphate; the alkali metal content being from 15 to 250 ppm of the hydrolyzed copolymer and the phosphorus content being from 5 to 70 ppm of the hydrolyzed copolymer.

The composition of the present invention is excellent in adhesive strength to a tie resin of a polyolefin modified with an unsaturated carboxylic acid.

DETAILED DESCRIPTION

The feature of the invention is that the secondary or tertiary alkali metal phosphate is contained in the hydrolyzed ethylene-vinyl acetate copolymer in order to improve the adhesive strength of the hydrolyzed copolymer layer to the unsaturated carboxylic acid modified polyolefin layer. Hitherto, in order to improve the thermal stability of the hydrolyzed ethylene-vinyl acetate copolymer, it has been attempted to add various acids or salts. However, there has entirely not been a fact that the secondary or tertiary alkali metal phosphate is used as disclosed in the present invention, and furthermore, the attempt that the above-mentioned specific salt is used in order to improve the adhesive strength of the hydrolyzed copolymer to the specific tie resin layer is firstly conducted in the present invention.

The hydrolyzed ethylene-vinyl acetate copolymer of the present invention has an ethylene content of 20 to 60% by mole, preferably from 25 to 55% by mole, and has a degree of hydrolysis in the vinyl acetate component of at least 95% by mole. When the ethylene content is below 20% by mole, the oxygen impermeability is lowered at high humidity. On the other hand, when the ethylene content is over 60% by mole, the properties such as oxygen impermeability and printability are lowered. When the degree of hydrolysis is below 95% by mole, the oxygen impermeability and the moisture resistance are lowered.

The hydrolyzed copolymer of the invention may include a small amount of comonomers, e.g. α-olefins such as propylene, iso-butene, α-octene, α-dodecene and α-octadecene; an unsaturated carboxylic acids, their salts, partial or complete alkyl esters, nitriles, amides and anhydrides; unsaturated sulfonic acids and their salts; and the like.

Examples of the secondary or tertiary alkali metal phosphate are, for instance, dipotassium hydrogenphosphate, disodium hydrogenphosphate, potassium tertiary phosphate, sodium tertiary phosphate, and the like. The secondary or tertiary phosphates are not limited thereto. These salts may be used alone or as an admixture thereof.

It is preferable that the content of the secondary or tertiary alkali metal phosphate is from 20 to 500 ppm of the hydrolyzed ethylene-vinyl acetate copolymer.

In the composition of the present invention, it is necessary that the alkali metal content is from 15 to 250 ppm of the hydrolyzed copolymer and the phosphorus content is from 5 to 70 ppm of the hydrolyzed copolymer.

When the alkali metal content is less than 15 ppm, the effect for improving adhesive strength between the unsaturated carboxylic acid-modified polyolefin layer and the hydrolyzed ethylene-vinyl acetate copolymer layer is poor. On the other hand, when the alkali metal content is more than 250 ppm, the molded article is colored. When the phosphorus content is less than 5 ppm, the effect for improving adhesive strength between the layers is poor, and on the other hand, when the phosphorus content is more than 70 ppm, fish eyes are formed in a large amount on the obtained film.

In the present invention, secondary or tertiary alkali metal phosphate is used alone usually in order to obtain the alkali metal content within the above-mentioned range. However, the composition may further comprise an alkali metal carboxylate and such alkali metal phosphate can be replaced partly by an alkali metal carboxylate. There is a case, according to the preparation procedure of the composition, that the adhesive strength between the layers can be more improved in the case that the alkali metal carboxylate is used with the secondary or tertiary alkali metal phosphate than in the case that the secondary or tertiary alkali metal phosphate is used alone.

When the alkali metal carboxylate is used with the secondary or tertiary alkali metal phosphate, the amount of the alkali metal carboxylate can be suitably decided so long as the alkali metal content in the composition is within the range of from 15 to 250 ppm of the hydrolyzed copolymer.

Examples of the carboxylic acids in the alkali metal carboxylate are, for instance, an acid having a pKa (25° C.) of about 3.5 to about 6 such as acetic acid and propionic acid, polymeric acid such as a carboxyl group-containing hydrolyzed ethylene-vinyl acetate copolymer, and the like. Examples of the alkali metal are, for instance, sodium, potassium, lithium, and the like. As the most practical alkali metal carboxylate, there are exemplified sodium acetate, potassium acetate, and the like. These alkali metal carboxylate are not limited thereto and they may be used alone or as an admixture thereof.

The preparation methods of the composition of the present invention are not particularly limited so long as the secondary or tertiary alkali metal phosphate, and in addition the alkali metal carboxylate as occasion demands, can be contained in the hydrolyzed ethylene-vinyl acetate copolymer. Generally, the salts are admixed with the powder, pellets or particles of the hydrolyzed ethylene-vinyl acetate copolymer. On the admixing, the salt is added to the hydrolyzed copolymer in any state such as a powder, solution or dispersion.

Also, the salt can be added in a predetermined amount not only to the hydrolyzed copolymer as mentioned above but also to any step during the preparation of the hydrolyzed ethylene-vinyl acetate copolymer such as a polymerization step, a hydrolysis step, a post-treatment step or a drying step.

The thus obtained hydrolyzed ethylene-vinyl acetate copolymer composition is useful for various uses such as molded articles, adhesives and coatings. Particularly, the composition is widely used as molded articles, and is formed into molded articles having any shape such as pellets, films, sheets, containers, fibers, rods or tubes by melt molding. Also, the pulverized articles (in case of recycling of used articles) or pellets may be further subjected to melt molding. The obtained films or sheets can be uniaxially or biaxially stretched. As a molding method, an extrusion such as T-die extrusion, tubular film process, blow molding, melt spinning or profile extrusion and injection molding are mainly applicable to molding of the composition of the present invention. The melt molding temperature is often selected from the range of 170° C. to 270° C. The above-mentioned injection molding includes two-color molding and injection blow molding, and the obtained molded articles have high dimensional precision.

Also, there can be molded the mixture of two or more kinds of the hydrolyzed ethylene-vinyl acetate copolymers different from each other in an ethylene content or a degree of hydrolysis. When the composition is subjected to melt molding, usual additives can be admixed in a suitable amount to the composition. Examples of the additives are, for instance, plasticizers such as polyhydric alcohols, stabilizers, surfactants, cross-linkable substances such as epoxy compounds, polyvalent metal salts and organic or inorganic polybasic acids and their salts, fillers, coloring agents, fibers used as reinforcement (glass fibers, carbon fibers, and the like), and the like. Also, other thermoplastic resins may be admixed in a suitable amount with the composition. Examples of the other thermoplastic resins are, for instance, polyolefins such as polyethylene, polypropylene, ethylene-propylene copolymers, ethylene-propylene-diene terpolymers, copolymers of ethylene and an α-olefin having not less than 4 carbon atoms, ethylene-vinyl acetate copolymers, ethylene-acrylic acid ester copolymers, ionomers, polybutene and polypentene; modified polyolefins prepared by graft-modification of the above-mentioned polyolefins with unsaturated carboxylic acids or derivatives thereof; polyamide, polyvinyl chloride, polyvinylidene chloride, polyester, polystyrene, polyacrylonitrile, polyurethane, polyacetal, polycarbonate, polyvinyl alcohol resin capable of melt molding, and the like.

When the extrusion is adopted as the melt molding method, not only the extrusion in which the composition of the invention is employed alone can be carried out but also there can be carried out the coextrusion in which the composition and other thermoplastic resins are melt kneaded separately and they are extruded so as to join at the inside or the outside of a die or a combining adaptor. Also, the composition of the invention can be extrusion-coated on a base material such as plastic film, metal foil or paper. As the other thermoplastic resin used in the coextrusion, the above-mentioned thermoplastic resins can be employed. Examples of the base material in the extrusion-coating are, for instance, films, sheets or laminated films of cellophane, polypropylene, polyamide, polyester, polyacetal, polycarbonate, polystyrene or polyvinyl chloride (they may be uniaxially or biaxially stretched, or their both or either sides are coated with a polyvinylidene chloride resin, and the like), and the like. The thus obtained films, sheets and containers are useful as wrapping or packaging materials for foods, medical supplies, industrial chemical reagents, agricultural chemicals, and the like.

The composition of the invention can most exhibit its features in a case of preparation of laminates having a structure wherein a polyolefin (A) layer and a hydrolyzed ethylene-vinyl acetate copolymer composition (C) layer are laminated through a tie resin layer of an unsaturated carboxylic acid-modified polyolefin (B) [a polyolefin (A) layer/a tie resin layer of an unsaturated carboxylic acid-modified polyolefin (B)/a hydrolyzed ethylene-vinyl acetate copolymer composition (C) layer].

In the tie resin (B) layer, the modified polyolefin wherein 0.01 to 2.5% by weight of an unsaturated carboxylic acid compound is graft-polymerized on a polyolefin resin is used. Examples of the polyolefin resins are, for instance, polyethylene, polypropylene, ethylene-vinyl acetate copolymer, and the like. Examples of the unsaturated carboxylic acid compound are, for instance, an unsaturated carboxylic acid such as acrylic acid, methacrylic acid, crotonic acid, maleic acid, fumaric acid or itaconic acid, and their alkyl esters, anhydrides, amides, imides and salts such as an acrylic amide, maleic acid diamide, N,N-diamide of fumaric acid, maleinimide, maleic anhydride, zinc acrylate, ammonium acrylate or sodium methacrylate. Known any grafting methods are applicable to grafting the unsaturated carboxylic acid compound with the polyolefin resin. Examples of the grafting methods are, for instance, a method wherein the unsaturated carboxylic acid compound and a radical initiator are added to the polyolefin resin and they are reacted in melted state, a method wherein the polyolefin resin is dispersed or dissolved in a suitable solvent and the unsaturated carboxylic acid compound, a radical initiator and, as occasion demands, a little amount of a radical polymerizable monomer are added thereto to conduct grafting, a method using an ionizing radiation, a method irradiating ultraviolet light, a method utilizing oxygen, ozone, heat or shear strength, or the like.

The multi-layer laminate having the polyolefin (A) layer, the tie resin (B) layer and the hydrolyzed ethylene-vinyl acetate copolymer composition (C) layer can be prepared any methods such as a method wherein the components (A), (B) and (C) are coextruded and are jointed at the inside or outside of a die, a method wherein the component (C) is formed into a film, the component (B) is melt-coated on the film (C) and the component (A) is melt-coated on the layer (B) on the layer (C), a method wherein the component (C) is formed into a film and the components (A) and (B) are co-melt coated on the film (C), a method wherein the component (A) is formed into a film, the component (B) is melt-coated on the film (A) and the component (C) is melt-coated on the layer (B) on the layer (A), a method wherein the component (A) is formed into a film and the components (B) and (C) are co-melt coated on the film (A), a method wherein the components (A) and (B) are formed into a two-layer laminate (A)/(B), the film of (C) is superimposed on the layer (B) of the laminate (A)/(B) and they are pressed under heating, a method wherein the components (B) and (C) are formed into a two-layer laminate (B)/(C), the film of (A) is superimposed on the layer (B) of the laminate (B)/(C) and they are pressed under heating, a method wherein two kinds of two-layer laminates [the laminate (A)/(B) and the laminate (B)/(C)] are formed from the components (A), (B) and (C), the layer (B) of the laminate (A)/(B) is superimposed on the layer (B) of the laminate (B)/(C) and they are pressed under heating, and the like.

Also, the polyolefin (A), the tie resin (B) and hydrolyzed ethylene-vinyl acetate copolymer composition (C) can be formed into not only the above-mentioned three-layer laminate [(A)/(B)/(C)] but also multi-layer laminates as mentioned below.

(A)/(B)/(C)/(B)/(A)

(C)/(B)/(A)/(B)/(C)

(A)/(B)/(C)/(B)/(A)/(B)/(C)

Furthermore, films of other resins, papers or an aluminum foil are laminated on the laminate having the fundamental structure (A)/(B)/(C).

The composition of the invention is excellent in adhesive strength to the unsaturated carboxylic acid-modified polyolefin, and therefore the laminates having a structure wherein the composition layer, the unsaturated carboxylic acid-modified polyolefin layer and the polyolefin layer are laminated, is excellent in the adhesive strength between the layers. The thus laminates are suitable for use of wrapping and packaging films, sheets, bags or containers for foods, table luxuries, seasoning matters, medical supplies, industrial chemical reagents, goods containing a perfume, and the like.

The present invention is more specifically described and explained by means of the following Examples in which all per cents and parts are by weight unless otherwise noted. It is to be understood that the present invention is not limited to the Examples, and various changes and modifications may be made in the invention without departing from the sperit and scope thereof.

In all Example 1–14 and Comparative Examples 1–9, used water was deionized water.

EXAMPLE 1

Preparation of the Hydrolyzed Ethylene-Vinyl Acetate Copolymer and the Composition of the Invention A pressure reactor was charged with 1,000 parts of a 40% methanol solution of ethylene-vinyl acetate copolymer having an ethylene content of 40% by mole and heated to 110° C. with stirring. Then, the hydrolysis reaction was carried out for 2.5 hours by continuously adding 40 parts of a 6% methanol solution of sodium hydroxide and 2,500 parts of methanol to the pressure reactor with removing methyl acetate produced as a by-product and excess methanol from the reaction system to give a hydrolyzed ethylene-vinyl acetate copolymer having a degree of hydrolysis in vinyl acetate component of 99.0% by mole.

After completing the hydrolysis reaction, the pressure reactor was charged with 450 parts of a mixture of methanol and water (methanol: water = 7:3) with distilling away excess methanol to give an aqueous methanol solution (water: methanol = 3:7) having a resin content of 39%.

The obtained solution of the hydrolyzed ethylene-vinyl acetate copolymer in the mixture of methanol and water having a temperature of 50° C. was extruded through a nozzle (hole diameter: 4 mm) at a rate of 1.5 liters/hour into a coagulating bath (width: 100 mm, length: 4,000 mm, height: 100 mm) having a mixture of water and methanol (water: methanol = 9:1) maintained at a temperature of 5° C. in the form of a strand. After completing the coagulation, the strand was passed (line speed: 2 m/minute) through a wind-up roller equipped at the end portion of the coagulating bath, and was cut by a cutter to prepare white porous pellets having a diameter of 4 mm and a length of 4 mm.

Then, 100 parts of the obtained pellets were washed by dipping in 300 parts of a 0.3% aqueous solution of acetic acid and stirring at 30° C. for 1 hour. After repeating the above washing twice, the slurry was filtered off. The obtained pellets were washed by mixing with 300 parts of water to give a slurry and stirring the slurry at 30° C. for 1 hour. After repeating the washing three times, the slurry was filtered off.

The pellets were dipped in 200 parts of a 0.015% aqueous solution of dipotassium hydrogenphosphate and stirred at 30° C. for 4 hours. Then, the slurry was filtered off and dried.

Thus obtained composition comprised a hydrolyzed ethylene-vinyl acetate copolymer having an ethylene content of 40% by mole and a degree of hydrolysis of 99.0% by mole in the vinyl acetate component, a potassium metal content of 155 ppm, a sodium metal content of 1 ppm and a phosphorus content of 12 ppm of the hydrolyzed copolymer.

The alkali metal contents and phosphorus content were determined as follows:

Alkali metal content

There is exactly determined about 10 g of the dried hydrolyzed copolymer composition, and it is charged in a platinum crucible and carbonized by using an electric heater. Then the sample in the platinum crucible is burned by heating with a gas burner until not giving out smoke. The platinum crucible is put into an electric furnace having a temperature of about 400° C., covered nearly all the platinum crucible with a cover of a porcelain crucible and the temperature of the furnace is gradually risen to 700° C. After completing the ashing by maintaining the temperature at 700° C. for 3 hours, the platinum crucible is taken out from the electric furnace. The platinum crucible is allowed to cool for 5 minutes and is allowed to stand in a desiccator for 25 minutes. The platinum crucible is charged with 2 ml of guaranteed hydrochloric acid (which is prescribed in Japanese Industrial Standard) and 3 ml of pure water and the ashes are dissolved by heating with an electric heater. The obtained solution is poured into a 50 ml measuring flask with pure water and pure water is added to the flask to its marked line to prepare a sample for atomic absorption analysis.

A standard solution for atomic absorption analysis [alkali metal (sodium or potassium): 1 ppm, hydrochloric acid: about 0.5N] is prepared separately. Potassium metal content and sodium metal content are determined by measurement of an absorbance ratio of an absorbance of the sample solution to an absorbance of the standard solution. Measuring conditions are as follows:

Apparatus: Hitachi 180-30 atomic absorption/flame spectrophotometer commercialy available from Hitachi, Ltd.

Wave length: 589.0 nm (sodium), 766.5 nm (potassium).

Flame: acetylene-air

Phosphorus content

Phosphorus content is determined by means of absorptiometry using molybdenum blue (ascorbic acid) according to Japanese Industrial Standard (JIS) K 0102.

A samples for the determination of phosphorus content is prepared according to the following procedure.

1. There is exactly determined about 1 g of the hydrolyzed copolymer composition and it is put into a 300 ml of Kjeldahl flask.

2. To the flask is added about 5 ml of pure water, and about 15 ml of concentrated sulfuric acid is gradually added dropwise thereto.

3. The flask is heated with an electric heater to remove water and sulfuric acid from the composition solution until just before the solution is evaporated to dryness.

4. After cooling the flask to room temperature, about 5 ml of concentrated sulfuric acid is added thereto and an inlet of the flask is covered with a funnel, and the flask is heated again with the electric heater.

5. When the flask is filled with white smoke, a few drops of concentrated nitric acid is gradually added dropwise to the flask. Nitric acid is stopped to add dropwise when the inside of the flask assumes dark brown with NOx gas, and heating is continued until the dark brown gas is replaced by white smoke in the flask. This dropping of nitric acid under heating is repeated several times.

6. When the solution in the Kjeldahl flask shows from colorless to transparent yellow-green, the dropping of nitric acid (step 5) is stopped. Then, nitric acid and water remaining in the solution are removed from the solution in the flask.

7. The funnel which covers the inlet of the flask is taken away, and sulfuric acid is removed from the solution by heating strongly until the amount of the solution in the flask reaches to 2 to 3 ml.

On the other hand, a blank test in which the composition is not added is separately carried out.

FORMING OF LAMINATE

The following components (A), (B) and (C) were subjected to coextrusion.

(A): A low density polyethylene (density: 0.924 g/cc, melt index: 3.0 g/10 minutes)

(B): A modified ethylene-vinyl acetate copolymer of 0.6% maleic anhydride-grafted ethylene-vinyl acetate copolymer having a vinyl acetate content of 9%

(C): The composition obtained in Example 1

The components (A), (B) and (C) were respectively fed into three extruders A, B and C (diameter: 40 mm, screw: full-flighted screw) connected to a three layer-multimanifold die, and melt-kneaded. The temperatures of dies of extruders A, B and C were 220° C., respectively. The melted components (A), (B) and (C) were jointed in the inside of the die with each other and extruded from the die having a width of 400 mm and the laminate was passed through a chill roll having a temperature of 50° C. at a roll-up speed of 5 m/minute to give a three-layer laminate having a width of about 300 mm and the following structure.

External layer (A): 40μ
Intermediate layer (B): 30μ
Internal layer (C): 30μ

From the obtained laminate, test piece having a width of 15 mm, and a length of about 300 mm was cut off along the direction of MD.

Adhesive strength between the layers

The adhesive strength between the layer (B) and the layer (C) of the test piece was measured by peeling off the same test piece in a length of about 50 mm three times, i.e., after allowing the test piece to stand for one hour, one day and three days. That is, the test piece was allowed to stand at 20° C. under 65% RH for the prescribed times shown in Table 1, and the test piece was subjected to T-peeling test using a tensile tester (Autograph S-100 made by shimadzu Corporation) [a distance between the chucks: 30 mm, a test speed: 300 mm/minute].

The change of adhesive strength between the layers (B) and (C) with the passage of time is shown in Table 1 as adhesive strength between the layers (B) and (C).

COMPARATIVE EXAMPLE 1

A hydrolyzed ethylene-vinyl acetate copolymer was prepared and the hydrolyzed copolymer was washed with the aqueous acetic acid solution and then water in the same manner as in Example 1 but the treatment with dipotassium hydrogenphosphate was not conducted. A three-layer laminate was prepared by using the obtained hydrolyzed copolymer as the component (C) in the same manner as in Example 1. The adhesive strength between the layer (B) and the layer (C) of the obtained laminate was measured in the same manner as in Example 1.

The result is shown in Table 1.

TABLE 1

| | Adhesive strength between the layers (B) and (C) (g/15 mm) | | |
| --- | --- | --- | --- |
| | After 1 hour | After 1 day | After 3 days |
| Ex. 1 | 1030 | 1100 | 1130 |
| Com. Ex. 1 | 70 | 90 | 110 |

EXAMPLES 2 TO 5 AND COMPARATIVE EXAMPLES 2 TO 5

The procedure of Example 1 was repeated except that as the component (B) a modified polyolefin shown in Table 2 was used to give a three-layer laminate. In Comparative Examples 2 to 5, as also the component (C), the hydrolyzed copolymer prepared in the same manner as in Comparative Example 1, i.e. without the treatment of dipotassium hydrogenphosphate, was used. The adhesive strength of the laminate was measured in the same manner as in Example 1.

The results are shown in Table 2.

TABLE 2

| | | | Adhesive strength between the layers (B) and (C) | | |
| --- | --- | --- | --- | --- | --- |
| Ex. No. | Component (B) | Component (C) | After 1 hour | After 1 day | After 3 days |
| Ex. 2 | A 1.3% maleic anhydride-grafted ethylene-vinyl acetate copolymer having a vinyl acetate content of 8% | Composition obtained in Example 1 | 940 | 960 | 1070 |
| Ex. 3 | A 1.1% maleic anhydride-grafted low density polyethylene | Composition obtained in Example 1 | 620 | 680 | 750 |
| Ex. 4 | A 2.1% acrylic acid-grafted ethylene-vinyl acetate copolymer having a vinyl acetate content of 36% | Composition obtained in Example 1 | 350 | 390 | 430 |
| Ex. 5 | A 0.3% crotonic acid-grafted ethylene-vinyl acetate copolymer having a vinyl acetate content of 28% | Composition obtained in Example 1 | 210 | 210 | 220 |
| Com. Ex. 2 | A 1.3% maleic anhydride-grafted ethylene-vinyl acetate copolymer having a vinyl acetate content of 8% | Hydrolyzed ethylene-vinyl acetate copolymer obtained in Comparative Example 1 | 270 | 420 | 530 |
| Com. Ex. 3 | A 1.1% maleic anhydride-grafted low density polyethylene | Hydrolyzed ethylene-vinyl acetate copolymer obtained in Comparative Example 1 | 70 | 80 | 90 |
| Com. Ex. 4 | A 2.1% acrylic acid-grafted ethylene-vinyl acetate copolymer having a vinyl acetate content of 36% | Hydrolyzed ethylene-vinyl acetate copolymer obtained in Comparative Example 1 | 40 | 50 | 50 |
| Com. Ex. 5 | A 0.3% crotonic acid-grafted ethylene-vinyl acetate copolymer having a vinyl acetate content of 28% | Hydrolyzed ethylene-vinyl acetate copolymer obtained in Comparative Example 1 | 40 | 50 | 50 |

EXAMPLES 6 TO 12 AND COMPARATIVE EXAMPLES 6 TO 9

The hydrolyzed ethylene-vinyl acetate copolymer was prepared in the same manner as in Example 1. The obtained pellets of the hydrolyzed copolymer were washed with the aqueous solution of acetic acid and then washed with water in the same manner as in Example 1. The pellets were immediately filtered and dried. There were sprayed 100 parts of the pellets of the hydrolyzed copolymer with 0.3 part of an aqueous solution of a salt shown in Table 3 having a content shown in Table 3, the pellets were repelletized under conditions mentioned below, in order to conduct mixing of the salt and drying of the pellets at the same time. A three-layer laminate was prepared in the same manner as in Example 1.

Extruder: Diameter: 40 mm, Vent-type extruder.
Screw: Dulmage torpedo screw.

Screw speed: 80 rpm.
Highest temperature of cylinder: 220° C.
Temperature of head: 210° C.
The results are shown in Table 3.

has excellent adhesive strength to unsaturated carboxylic acid-modified polyolefins.

In addition to the ingredients used in the Examples, other ingredients can be used as set forth in the specification to obtain substantially the same results.

TABLE 3

| | Phosphate | | Carboxylic acid salt | | Metal content (ppm)*2 | |
|---|---|---|---|---|---|---|
| | Kind | Amount*1 | Kind | Amount*2 | Sodium | Potassium |
| Ex. No. | | | | | | |
| 6 | Dipotassium hydrogenphosphate | 400 | — | — | 1 | 180 |
| 7 | Dipotassium hydrogenphosphate | 200 | Potassium acetate | 200 | 1 | 170 |
| 8 | Disodium hydrogenphosphate | 300 | — | — | 96 | 1 |
| 9 | Disodium hydrogenphosphate | 200 | Sodium acetate | 200 | 121 | 1 |
| 10 | Disodium hydrogenphosphate | 200 | Potassium acetate | 200 | 57 | 90 |
| 11 | Potassium phosphate | 400 | — | — | 1 | 222 |
| 12 | Potassium phosphate | 200 | Potassium acetate | 200 | 1 | 191 |
| Com. Ex. No. | | | | | | |
| 6 | Disodium hydrogenphosphate | 600 | — | — | 192 | 1 |
| 7 | Dipotassium hydrogenphosphate | 20 | Potassium acetate | 380 | 1 | 161 |
| 8 | Dipotassium hydrogenphosphate | 30 | — | — | 1 | 13 |
| 9 | Dipotassium hydrogenphosphate | 300 | Potassium acetate | 300 | 1 | 294 |

| | Phosphorus content (ppm*2) | Adhesion strength between the layers (B) and (C) (g/15 mm) | | | Color of the film*3 | The number of fish eyes*4 (the number/100 cm²) |
|---|---|---|---|---|---|---|
| | | After 1 hour | After 1 day | After 3 days | | |
| Ex. No. | | | | | | |
| 6 | 70 | 340 | 420 | 590 | The film was not colored. | 1 to 2 |
| 7 | 36 | 480 | 780 | 800 | The film was not colored. | " |
| 8 | 66 | 310 | 380 | 540 | The film was not colored. | " |
| 9 | 44 | 350 | 670 | 900 | The film was not colored. | " |
| 10 | 36 | 460 | 750 | 900 | The film was not colored. | " |
| 11 | 58 | 330 | 330 | 330 | The film was not colored. | " |
| 12 | 29 | 450 | 500 | 520 | The film was not colored. | " |
| Com. Ex. No. | | | | | | |
| 6 | 132 | 430 | 350 | 220 | The film was colored yellow. | 30 to 50 |
| 7 | 4 | 290 | 260 | 160 | The film was not colored. | 2 to 3 |
| 8 | 5 | 150 | 130 | 110 | The film was not colored. | 2 to 3 |
| 9 | 42 | 450 | 360 | 220 | The film was colored yellow. | 10 to 15 |

(Notes)
*1 ppm to the hydrolyzed ethylene-vinyl acetate copolymer
*2 ppm to the hydrolyzed ethylene-vinyl acetate copolymer
*3 The obtained laminate was observed with the naked eye.
*4 The number of fish eyes (diameter: at least 0.1 mm) per area of 100 cm² of the film was counted by overhead projector.

EXAMPLES 13 AND 14

A three-layer laminate was prepared in the same manner as in Example 1 except that as the component (A) a hydrolyzed ethylene-vinyl acetate copolymer shown in Table 4 was used instead of the hydrolyzed copolymer having the ethylene content of 40% by mole and the degree of hydrolysis of 99.0% by mole. The adhesive strength of the obtained laminate between the layers (B) and (C) was measured in the same manner as in Example 1.

The results are shown in Table 4.

TABLE 4

| | Hydrolyzed ethylene-vinyl acetate copolymer | | Adhesive strength between the layers (B) and (C) (g/15 mm) | | |
|---|---|---|---|---|---|
| Ex. No. | Ethylene content (% by mole) | Degree of hydrolysis (% by mole) | After 1 hour | After 1 day | After 3 days |
| Ex. 13 | 30 | 99.5 | 1200 | 1300 | 1400 |
| Ex. 14 | 44 | 99.0 | 820 | 880 | 900 |

As shown above, the hydrolyzed ethylene-vinyl acetate copolymer composition of the present invention

What we claim is:

1. A composition consisting essentially of
   (1) a hydrolyzed ethylene-vinyl acetate copolymer having an ethylene content of 20 to 60 mol % and a degree of hydrolysis in the vinyl acetate component of at least 95 mol %, and
   (2) a secondary or tertiary alkali metal phosphate, the alkali metal content of the composition being from 15 to 250 ppm based on said hydrolyzed copolymer (1) and the phosphorus content of the composition being from 5 to 70 ppm based on said hydrolyzed copolymer (1).

2. The composition of claim 1, wherein said composition further comprises an alkali metal acetate or propionate.

* * * * *